United States Patent
Holzapfel et al.

(10) Patent No.: US 7,426,790 B2
(45) Date of Patent: Sep. 23, 2008

(54) METHOD FOR INITIALIZING A POSITION-MEASURING SYSTEM

(75) Inventors: Wolfgang Holzapfel, Obing (DE); Kai Rascher, Traunstein (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 18 days.

(21) Appl. No.: 11/693,655

(22) Filed: Mar. 29, 2007

(65) Prior Publication Data

US 2007/0227019 A1 Oct. 4, 2007

(30) Foreign Application Priority Data

Apr. 4, 2006 (DE) ........................ 10 2006 015 725

(51) Int. Cl.
*G01D 5/347* (2006.01)
(52) U.S. Cl. ........................................... 33/706; 33/503
(58) Field of Classification Search .................... 33/706, 33/707, 708, 503, 556, 557, 558
See application file for complete search history.

(56) References Cited

U.S. PATENT DOCUMENTS

| | | | | |
|---|---|---|---|---|
| 4,459,750 A | * | 7/1984 | Affa | 33/707 |
| 5,115,573 A | * | 5/1992 | Rieder et al. | 33/706 |
| 5,456,020 A | * | 10/1995 | Kellner | 33/707 |
| 6,158,136 A | * | 12/2000 | Gotz et al. | 33/503 |
| 6,587,810 B1 | * | 7/2003 | Guth et al. | 33/503 |
| 6,901,677 B2 | * | 6/2005 | Smith et al. | 33/556 |
| 2004/0168333 A1 | * | 9/2004 | Mauerberger et al. | 33/707 |
| 2005/0060905 A1 | * | 3/2005 | Novak et al. | 33/706 |
| 2007/0256313 A1 | * | 11/2007 | McAdam | 33/706 |

* cited by examiner

*Primary Examiner*—G. Bradley Bennett
(74) *Attorney, Agent, or Firm*—Kenyon & Kenyon LLP

(57) ABSTRACT

A method is for initializing a position-measuring system for an object movable in at least two degrees of freedom relative to a measuring frame. The position-measuring system includes one position-measuring device per degree of freedom, including a scale having an incremental track for measuring relative positions and an absolute track for measuring absolute positions, as well as scanning heads, assigned to the scales, for reading the incremental tracks and absolute tracks. In an initialization step, the incremental tracks are evaluated using a first evaluation procedure having a large tolerance with respect to the alignment of scanning head and associated scale, and in so doing, approximate absolute positions are determined per degree of freedom. In an alignment step, the movable object is aligned relative to the measuring frame based on the approximate position. In an acquisition step, the absolute tracks are evaluated using a second evaluation procedure having a low tolerance with respect to the alignment of scanning head and associated scale, and precise absolute positions are determined for each degree of freedom.

20 Claims, 3 Drawing Sheets

METHOD FOR INITIALIZING A POSITION-MEASURING SYSTEM

CROSS-REFERENCE TO RELATED APPLICATIONS

The present application claims priority to Application No. 10 2006 015 725.7, filed in the Federal Republic of Germany on Apr. 4, 2006, which is expressly incorporated herein in its entirety by reference thereto.

FIELD OF THE INVENTION

The present invention relates to a method for initializing a position-measuring system, which may permit the startup of a position-measuring system for an object movable in several degrees of freedom relative to a measuring frame.

BACKGROUND INFORMATION

For high-precision position-measuring tasks in the nanometer range and below, it is not possible to measure the individual axes of a machine sequentially. In such a sequential measuring system, the individual measuring devices for each axis are mounted one upon the other, so that, for example, the stationary part of the second measuring device for the Y-direction is connected to the movable part of the first position-measuring device for the X-direction perpendicular to the Y-direction. The object to be monitored (e.g., a positioning table) is connected to the movable part of the second measuring device. In the guidance for the X-direction, small guidance deviations occur in the Y-direction, as well. However, in a sequential measuring system, such guidance deviations cannot be detected by the second position-measuring device, since it is moved along as a whole with these guidance deviations. Even in the case of very high-quality guidances, deviations of several nanometers can occur transversely to the guidance direction. A high-precision position measurement in several directions using a sequential measurement arrangement is therefore ruled out.

It is necessary to securely join the stationary parts of the measuring devices for all measuring directions to a measuring frame, and the movable parts to the object to be monitored. Only in this manner is it ensured that each measuring device is really able to detect all relevant movements in the respective measuring direction. For example, on the movable object, it is possible to mount scales having optical, magnetic or capacitive graduations that are scanned or read in contactless fashion by corresponding scanning heads attached to the measuring frame. In addition to a high-precision, incremental track, such scales usually include further tracks that contain absolute position information. In the simplest case, this may be a reference mark which, when it is traveled over by the scanning head, is assigned to one signal period of the incremental track, and thereby supplies absolute position information; or it may also be an absolutely coded track which permits the readout of an absolute position in every position of the position-measuring device. Such tracks are denoted hereinafter as absolute tracks. The allocation of the absolute track to the incremental track is important, since only in this manner is it possible to form exact position values.

Generally, the incremental signals resulting from the scanning of the incremental tracks, and usually also the absolute signals resulting from the scanning of the absolute tracks, are able to be acquired and evaluated over a wide tolerance range with respect to the alignment of the scale and the associated scanning head. However, this does not hold true for the assignment of the absolute position information from the absolute track to the relative position information from the incremental track. This assignment is also referred to as the connection of the absolute track to the incremental track. So that one signal period of the associated incremental track may be assigned clearly to each item of absolute information, it is necessary to adhere to quite a small tolerance for the alignment between the scanning head and the allocated scale, this tolerance also being referred to hereinafter as connection tolerance.

When starting up a machine having such a position-measuring system made up of a plurality of position-measuring devices for several degrees of freedom or measuring directions, the problem may arise that initially the alignment of the movable object relative to the measuring frame is only very rough, e.g., by way of mechanical stops. Therefore, during the startup, only a quite large tolerance is provided with respect to the alignment between object and measuring frame, which hereinafter is also referred to as initial tolerance. Too large a scanning distance, or too large a mutual tilt between the scanning heads and the allocated scales, can make the evaluation of the absolute information or its assignment to the incremental track impossible. This is also the case when angle axes are also involved. An initialization of the position-measuring system is therefore very difficult.

SUMMARY

Therefore, example embodiments of the present invention may provide a method by which it is possible to initialize a position-measuring system for several degrees of freedom even when the position of the scanning heads and scales of the participant position-measuring devices initially does not allow an exact position measurement.

A method as described herein is for initializing a position-measuring system for an object movable in at least two degrees of freedom relative to a measuring frame. The position-measuring system has at least one position-measuring device per degree of freedom, including a scale having an incremental track for measuring relative positions and an absolute track for measuring absolute positions, as well as scanning heads, assigned to the scales, for reading the incremental tracks and absolute tracks.

In an initialization step, the incremental track or the absolute track is evaluated using a first evaluation procedure, and in so doing, an evaluation result is formed. In an alignment step, the movable object is aligned relative to the measuring frame based on the evaluation result from the initialization step. In an acquisition step, the absolute tracks are evaluated using a second evaluation procedure having a small tolerance with respect to the alignment of the scanning head and associated scale, and exact absolute positions are determined for each degree of freedom by clearly assigning the signals of the absolute tracks to the signal periods of the incremental tracks.

The method is based on, in an initialization step, reading out the participant position-measuring devices using a first evaluation procedure that differs from the second evaluation procedure, and, in so doing, forming an evaluation result which, in an alignment step, makes it possible to bring the movable object into a well-defined starting position relative to the measuring frame, in which the position of the scales and scanning heads relative to each other conforms with the connection tolerance necessary for the exact position measurement. Several iterative initialization and alignment steps may also be performed until the small tolerances or connection tolerances are observed. For example, a check to this effect may be carried out after each alignment step, the method then branching either to a further initialization step or to the acquisition step.

After a successful acquisition step in which unambiguous absolute position information is assigned to one signal period of the incremental track, it is possible to dispense with the readout of the absolute tracks completely, in that only a counter simultaneously counts the signal periods of the incremental track. Since a connection of the absolute track to the incremental track is also no longer necessary, the tolerance for the alignment between the scanning heads and the allocated scales, also referred to hereinafter as operating tolerance, may again be markedly greater than the connection tolerance. It may even correspond to the initial tolerance. However, if for reasons of operational reliability, the constant allocation of absolute information and incremental information is necessary, the operating tolerance is selected to be as narrow as the connection tolerance. The connection tolerance is thus considerably less than the initial tolerance. The operating tolerance may be between the connection tolerance and the initial tolerance, depending on the application case.

According to an example embodiment of the present invention, a method for initializing a position-measuring system for an object movable in at least two degrees of freedom relative to a measuring frame, the position-measuring system including at least one position-measuring device per degree of freedom, each position-measuring device having a scale including an incremental track for measuring a relative position and an absolute track for measuring an absolute position and scanning heads, corresponding to the scales, for reading the incremental track and absolute track, includes: an initialization step in which at least one of the incremental tracks and the absolute tracks are evaluated with a first evaluation procedure to form an evaluation result; an alignment step in which the movable object is aligned relative to the measuring frame based on the evaluation result; and an acquisition step in which the absolute tracks are evaluated with a second evaluation procedure having a small tolerance with respect to alignment of the scanning head and the corresponding scale to determine a precise absolute position for each degree of freedom.

In the initialization step, the absolute tracks may be evaluated with the first evaluation procedure, an approximate absolute position may be determined as the evaluation result for each degree of freedom, and the first evaluation procedure may have a large tolerance with respect to the alignment of the scanning head and the corresponding scale.

Based on the approximate absolute positions ascertained in the initialization step, an alignment of the object relative to the measuring frame, and therefore of the scanning heads relative to the scales, may be performed, so that the small tolerance is adhered to in the acquisition step.

The absolute track may include a reference mark that is evaluated in the first evaluation procedure and the second evaluation procedure.

The first evaluation procedure may provide only an approximate assignment of the reference mark to the incremental track, and the second evaluation procedure may guarantee a precise assignment of the reference mark to the incremental track.

The absolute track may include a code in which a plurality of absolute positions are coded, and the code may be evaluated in the first evaluation procedure and the second evaluation procedure.

The approximate absolute position may be determined based only on the absolute track.

In the initialization step, the incremental tracks may be evaluated with the first evaluation procedure, and, for each degree of freedom, a signal property of scanning signals of the incremental tracks may be determined as the evaluation result.

Based on the signal properties ascertained in the initialization step, an alignment of the object relative to the measuring frame, and therefore of the scanning heads relative to the scales, may be performed so that the small tolerance is adhered to in the acquisition step.

The signal property of the scanning signals may include signal strength.

According to an example embodiment of the present invention, a method for initializing a position-measuring system for an object movable in at least two degrees of freedom relative to a measuring frame, the position-measuring system including at least one position-measuring device per degree of freedom, each position-measuring device having a scale including an incremental track for measuring a relative position and an absolute track for measuring an absolute position and scanning heads, corresponding to the scales, for reading the incremental track and absolute track, includes: evaluating, in an initialization step, at least one of (a) the incremental track and (b) the absolute track of each position-measuring device with a first evaluation procedure to form an evaluation result; aligning, in an alignment step, the movable object relative to the measuring frame based on the evaluation result; and evaluating, in an acquisition step, the absolute track of each position-measuring device with a second evaluation procedure having a small tolerance with respect to alignment of scanning head and the corresponding scale to determine a precise absolute position for each degree of freedom.

The initialization step may include: evaluating the absolute track of each position-measuring device with the first evaluation procedure, the first evaluation procedure having a large tolerance with respect to the alignment of the scanning head and the corresponding scale; and determining an approximate absolute position as the evaluation result for each degree of freedom.

The alignment step may include aligning the object relative to the measuring frame, and therefore the scanning heads relative to the scales, in accordance with the approximate absolute position determined in the initialization step to adhere to the small tolerance in the acquisition step.

The absolute track may include a reference mark evaluated in the first evaluation procedure and the second evaluation procedure.

The first evaluation procedure may provide only an approximate assignment of the reference mark to the incremental track, and the second evaluation procedure may guarantee a precise assignment of the reference mark to the incremental track.

The absolute track may include a code, a plurality of absolute positions may be coded in the code, and the first evaluation procedure and the second evaluation procedure may include evaluation of the code.

The approximate absolute position may be determined in the determining step based only on the absolute track.

The initialization step may include: evaluating the incremental tracks in the first evaluation procedure; and determining, for each degree of freedom, a signal property of scanning signals of the incremental tracks as the evaluation result.

The method may include aligning the object relative to the measuring frame, and therefore the scanning heads relative to the scales, in accordance with the signal properties determined in the initialization step to adhere to the small tolerance in the acquisition step.

The signal property may include a signal strength.

Further features and aspects of example embodiments of the present invention are described in more detail below with reference to the appended Figures.

DETAILED DESCRIPTION

Figure 1:
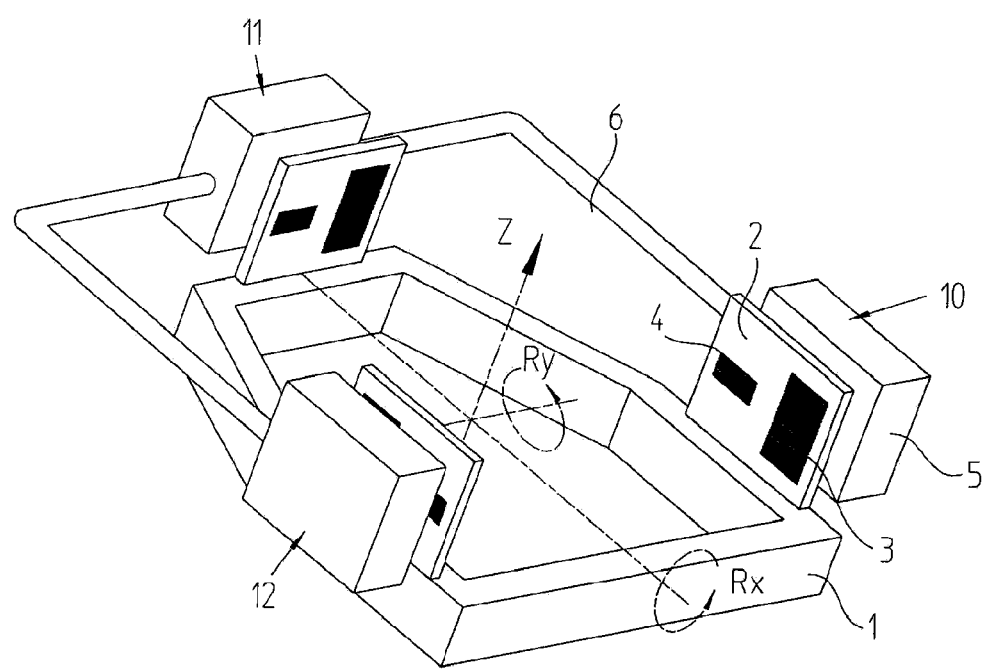
FIG. 1 illustrates a movable object with three position-measuring devices.

FIG. 1 illustrates a movable object 1. Object 1 is movable in two rotary degrees of freedom Rx and Ry and in one translatory degree of freedom Z. The tilt axes are in the plane of planar object 1 and are aligned perpendicular to one another. The Z axis is perpendicular to the two tilt axes.

Three scales 2, each bearing an incremental track 3 and an absolute track 4, are secured on object 1. Scanning heads 5, which are assigned to respective scales 2 and are able to read out both incremental tracks 3 and absolute tracks 4 and perform a conversion into electrical signals, are secured to a measuring frame 6

Scales 2 and scanning heads 5 form three position-measuring devices 10, 11, 12 which measure tilt angles Rx, Ry and Z-position Z. In this context, tilt angle Rx may be derived from the difference between the measurements of position measuring devices 10 and 12 (P12−P10). Tilt angle Ry may be determined from the difference between the measurement of position-measuring device 11 and the half sum from the measurements of position-measuring devices 10 and 12 (P11−0.5*(P10+P12)). The position in the Z direction may be determined based on the sum of all three position-measuring devices 10, 11, 12 (P10+P11+P12). In this context, P10, P11, P12 stand for the position values ascertained by respective position-measuring devices 10, 11, 12.

Absolute tracks 4 have reference marks, which in each case are used to mark one signal period of incremental tracks 3. By interpolation within the periods of incremental tracks 3 and assignment of one of these periods to the reference marks of absolute tracks 4, a highly accurate, absolute position measurement is possible for all degrees of freedom Rx, Ry, Z.

Figure 2A:
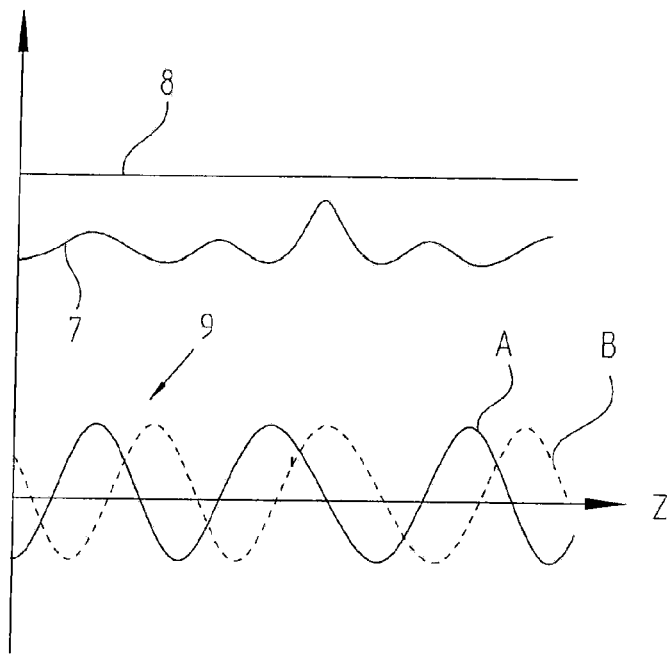
FIGS. 2a and 2b illustrate signals of the scanning heads before and after the alignment step.

FIG. 2a illustrates signals 7, 9 of scanning head 12 for acquiring the position of object 1 as a function of degree of freedom Z. As customary, incremental signals 9 are two periodic signals A and B out of phase by 90 degrees relative to each other.

For recognition of the reference mark of absolute track 4 and its assignment to one period of incremental signals 9, it would be necessary for reference-mark signal 7 to exceed a trigger threshold 8. However, because of the tilting of the object in degree of freedom Ry, reference-mark signal 7 is degenerated to the point that this trigger threshold 8 is no longer reached. The aim is to assign the signal peak of reference-mark signal 7 clearly to one period of incremental signals 9. Only then may an accurate position determination be possible.

Figure 3:
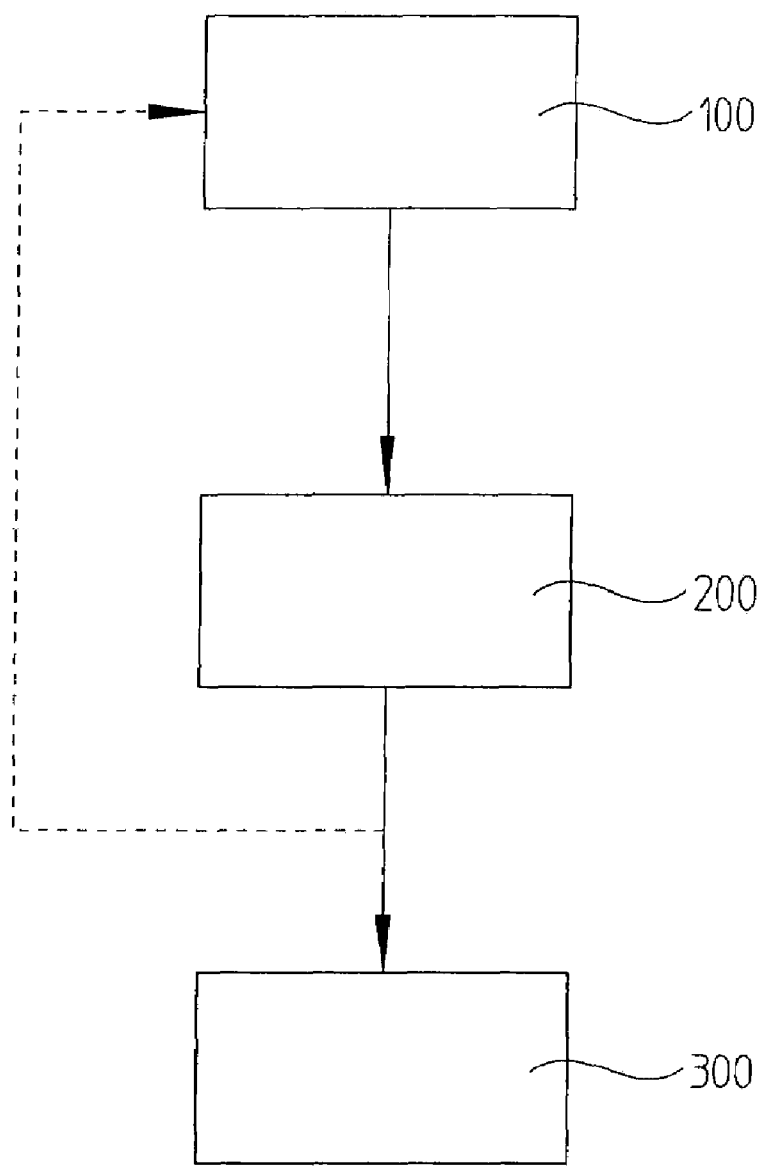
FIG. 3 is a flow chart of a method according to an example embodiment of the present invention.

Therefore, as illustrated, e.g., in FIG. 3, initially a first evaluation procedure is used for absolute track 4 or its reference mark, which allows only an approximate position determination, but in return has a high tolerance corresponding to the initial tolerance with respect to the alignment between the scanning head and associated scale.

An approximate position determination means, for example, that the assignment of the reference mark to incremental track 3 is accurate only to a few signal periods. However, for example, only one absolute track 4 may also be read out, with which several absolute positions are coded (e.g., with a PRC code) without assigning this absolute track 4 to incremental track 3 at all. In this instance, the readout of incremental track 3 is only necessary when the machine axes must be regulated during the initialization using the incremental-track information, e.g., in the alignment step.

Thus, for example, reference-mark signal 7 illustrated in FIG. 2a may be evaluated using a block filter that integrates reference-mark signal 7 over a specific width. The width may correspond approximately to the anticipated width of the signal peak in reference-mark signal 7, in order to achieve optimal suppression of noise and other spurious peaks. If one allows this width to travel over reference-mark signal 7, then the integral will be the greatest approximately in the area of the actual position of the reference mark. Even if the position of the reference mark thus determined cannot be assigned with certainty to a specific signal period of incremental track 3, this assignment is accurate to a few signal periods. Thus, an approximate position value may be determined as an evaluation result for all degrees of freedom Rx, Ry, Z and used in alignment step 200 for aligning object 1.

An example for a further procedure for evaluating reference-mark signal 7, which is suitable when the reference-mark signal has some specific pattern (e.g., several peaks with certain, possibly variable spacings), is a cross-correlation calculation using a corresponding pattern and an appraisal of the result of the cross-correlation calculation. The location of the highest correlation will correspond approximately to the position of the reference mark.

In the case of reference-mark signals 7 which have a local signal modulation with defined frequency, it may be provided in a first step to filter this frequency in order to determine its amplitude, and to search for its maximum and thereby to ascertain the approximate position of the reference mark. In this context, the signal modulation may also take place through several defined frequencies.

The goal of all these processes in initialization step 100 is to free the useful signal in reference-mark signal 7 from noise and spurious peaks, and thus to achieve an evaluation with great tolerance corresponding to the initial tolerance with respect to the alignment of scanning head and scale.

In an alignment step 200, based on the approximate position values determined in initialization step 100, object 1 is positioned so that scanning heads 5 are now better aligned with respect to scales 2.

Figure 2B:
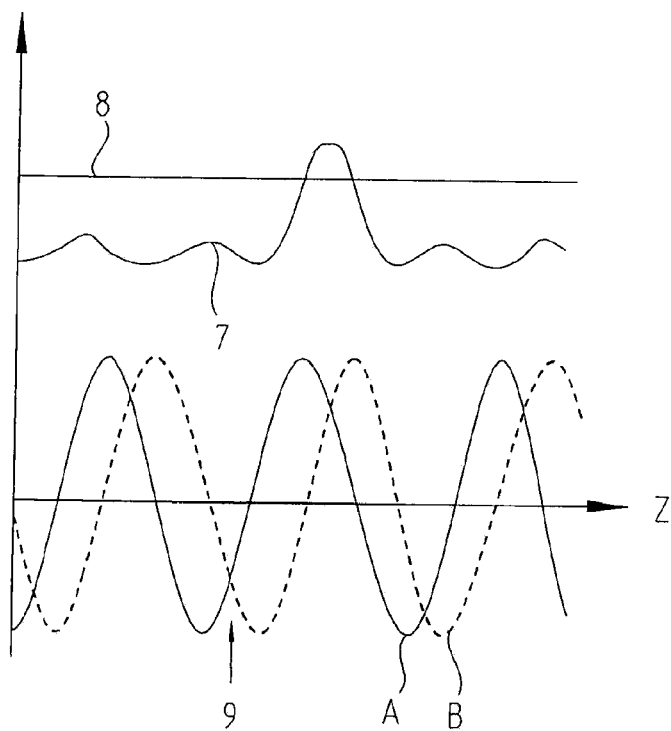

In an acquisition step 300, it is possible to acquire the exact position of object 1 relative to measuring frame 6. FIG. 2b illustrates that reference-mark signal 7 exceeds trigger threshold 8 for an exact acquisition of the reference-mark position. The connection tolerance regarding the alignment of scanning head 12 with respect to its assigned scale is satisfied. Therefore, a clear assignment of absolute track 4 or its reference mark to one signal period of incremental signal 9 is also possible. By interpolation of incremental track 3 and the counting of periods, a very precise position determination is possible over the entire measuring length.

If, after alignment step 200, the alignment of scanning heads 5 and scales 2 still does not satisfy the connection tolerance of the second evaluation procedure of absolute track 4, further initialization steps 100 and alignment steps 200 may then be carried out with increasingly more accurate alignment until it is possible to branch to acquisition step 300. To this end, between alignment step 200 and acquisition step 300, a conditional branching may be inserted which branches to initialization step 100 when the connection tolerance for the second evaluation procedure is still not satisfied, and otherwise branches to the acquisition step. This is indicated by an arrow with a dashed line in FIG. 3.

Additionally or alternatively, in initialization step 100, it is not absolute tracks 4 as described above, but rather incremental tracks 3 that are evaluated using a first evaluation procedure. In so doing, approximate absolute positions are not ascertained, but rather a signal property of incremental signals 9 is evaluated, and a corresponding evaluation result is formed. Thus, for example, based on the signal strength or amplitude of the two signals A, B out of phase by 90 degrees relative to each other, it is possible to infer the alignment between scanning head 5 and scale 2. In the aligned state (see, e.g., FIG. 2b), thus upon adherence to the alignment tolerance, this amplitude is perceptibly greater than in the non-aligned state (see, e.g., FIG. 2a, alignment tolerance not satisfied). Thus, if it is ascertained during initialization step 100 that the amplitude in question is too low, then, for example, in alignment step 200, the tilt of object 1 with respect to degree of freedom Ry may be altered until the amplitude reaches a value which indicates an aligned state in which the connection tolerance is satisfied. In this context, initialization step 100 (determination of the amplitude) and alignment step 200 (the tilting of object 1 with respect to Ry) are executed until acquisition step 300 is possible.

Other possible signal properties of periodic incremental signals 9 which are suitable as a signal property for evaluation in initialization step 100 include the phase position of the two incremental signals A and B, out of phase by 90 degrees in the ideal case, or also their zero shift.

What is claimed is:

1. A method for initializing a position-measuring system for an object movable in at least two degrees of freedom relative to a measuring frame, the position-measuring system including at least one position-measuring device per degree of freedom, each position-measuring device having a scale including an incremental track for measuring a relative position and an absolute track for measuring an absolute position and scanning heads, corresponding to the scales, for reading the incremental track and absolute track, comprising:
   an initialization step in which at least one of the incremental tracks and the absolute tracks are evaluated with a first evaluation procedure to form an evaluation result;
   an alignment step in which the movable object is aligned relative to the measuring frame based on the evaluation result; and
   an acquisition step in which the absolute tracks are evaluated with a second evaluation procedure having a small tolerance with respect to alignment of scanning head and the corresponding scale to determine a precise absolute position for each degree of freedom.

2. The method according to claim 1, wherein in the initialization step, the absolute tracks are evaluated with the first evaluation procedure, and an approximate absolute position is determined as the evaluation result for each degree of freedom, the first evaluation procedure having a large tolerance with respect to the alignment of the scanning head and the corresponding scale.

3. The method according to claim 2, wherein, based on the approximate absolute positions ascertained in the initialization step, an alignment of the object relative to the measuring frame, and therefore of the scanning heads relative to the scales, is performed, so that the small tolerance is adhered to in the acquisition step.

4. The method according to claim 2, wherein the absolute track includes a reference mark that is evaluated in the first evaluation procedure and the second evaluation procedure.

5. The method according to claim 4, wherein the first evaluation procedure provides only an approximate assignment of the reference mark to the incremental track and the second evaluation procedure guarantees a precise assignment of the reference mark to the incremental track.

6. The method according to claim 2, wherein the absolute track includes a code in which a plurality of absolute positions are coded, and the code is evaluated in the first evaluation procedure and the second evaluation procedure.

7. The method according to claim 6, wherein the approximate absolute position is determined based only on the absolute track.

8. The method according to claim 1, wherein in the initialization step, the incremental tracks are evaluated with the first evaluation procedure, and, for each degree of freedom, a signal property of scanning signals of the incremental tracks is determined as the evaluation result.

9. The method according to claim 8, wherein based on the signal properties ascertained in the initialization step, an alignment of the object relative to the measuring frame, and therefore of the scanning heads relative to the scales, is performed so that the small tolerance is adhered to in the acquisition step.

10. The method according to claim 8, wherein the signal property of the scanning signals includes signal strength.

11. A method for initializing a position-measuring system for an object movable in at least two degrees of freedom relative to a measuring frame, the position-measuring system including at least one position-measuring device per degree of freedom, each position-measuring device having a scale including an incremental track for measuring a relative position and an absolute track for measuring an absolute position and scanning heads, corresponding to the scales, for reading the incremental track and absolute track, comprising:
   evaluating, in an initialization step, at least one of (a) the incremental track and (b) the absolute track of each position-measuring device with a first evaluation procedure to form an evaluation result;
   aligning, in an alignment step, the movable object relative to the measuring frame based on the evaluation result; and
   evaluating, in an acquisition step, the absolute track of each position-measuring device with a second evaluation procedure having a small tolerance with respect to alignment of scanning head and the corresponding scale to determine a precise absolute position for each degree of freedom.

12. The method according to claim 11, wherein the initialization step includes:
   evaluating the absolute track of each position-measuring device with the first evaluation procedure, the first evaluation procedure having a large tolerance with respect to the alignment of the scanning head and the corresponding scale; and
   determining an approximate absolute position as the evaluation result for each degree of freedom.

13. The method according to claim 12, wherein the alignment step includes aligning the object relative to the measuring frame, and therefore the scanning heads relative to the scales, in accordance with the approximate absolute position determined in the initialization step to adhere to the small tolerance in the acquisition step.

14. The method according to claim 12, wherein the absolute track includes a reference mark evaluated in the first evaluation procedure and the second evaluation procedure.

15. The method according to claim 14, wherein the first evaluation procedure provides only an approximate assignment of the reference mark to the incremental track and the second evaluation procedure guarantees a precise assignment of the reference mark to the incremental track.

16. The method according to claim 12, wherein the absolute track includes a code, a plurality of absolute positions coded in the code, the first evaluation procedure and the second evaluation procedure including evaluation of the code.

17. The method according to claim 16, wherein the approximate absolute position is determined in the determining step based only on the absolute track.

18. The method according to claim 11, wherein the initialization step includes:
    evaluating the incremental tracks in the first evaluation procedure; and
    determining, for each degree of freedom, a signal property of scanning signals of the incremental tracks as the evaluation result.

19. The method according to claim 18, further comprising aligning the object relative to the measuring frame, and therefore the scanning heads relative to the scales, in accordance with the signal properties determined in the initialization step to adhere to the small tolerance in the acquisition step.

20. The method according to claim 18, wherein the signal property includes a signal strength.

* * * * *